US010528353B2

United States Patent
Levitan et al.

(10) Patent No.: US 10,528,353 B2
(45) Date of Patent: Jan. 7, 2020

(54) GENERATING A MASK VECTOR FOR DETERMINING A PROCESSOR INSTRUCTION ADDRESS USING AN INSTRUCTION TAG IN A MULTI-SLICE PROCESSOR

(71) Applicant: International Business Machines Corporation, Armonk, NY (US)

(72) Inventors: David S. Levitan, Austin, TX (US); Mehul Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 15/162,998

(22) Filed: May 24, 2016

(65) Prior Publication Data
US 2017/0344379 A1 Nov. 30, 2017

(51) Int. Cl.
*G06F 9/38* (2018.01)
*G06F 9/30* (2018.01)

(52) U.S. Cl.
CPC ........ *G06F 9/3802* (2013.01); *G06F 9/30018* (2013.01); *G06F 9/3891* (2013.01)

(58) Field of Classification Search
CPC .. G06F 9/327; G06F 9/30021; G06F 9/30036; G06F 9/3802
See application file for complete search history.

(56) References Cited

U.S. PATENT DOCUMENTS

| 4,985,825 | A | | 1/1991 | Webb, Jr. et al. |
| 5,781,752 | A | | 7/1998 | Moshovos et al. |
| 5,832,288 | A | * | 11/1998 | Wong .................. G06F 9/30018 712/5 |

(Continued)

FOREIGN PATENT DOCUMENTS

WO    WO-9802805 A1    1/1998

OTHER PUBLICATIONS

Anonymous, "Quadrant based Instruction ID assignment for SMT (Simultaneous Multithreading) microprocessor", An IP.com Prior Art Database Technical Disclosure (online), IP.com No. 000239611, URL: http://ip.com/IPCOM/000239611, dated Nov. 19, 2014, 4 pages.

(Continued)

*Primary Examiner* — Eric Coleman
(74) *Attorney, Agent, or Firm* — Nathan M. Rau

(57) ABSTRACT

Methods and apparatus for generating a mask vector for determining a processor instruction address using an instruction tag (ITAG) in a multi-slice processor including receiving a first ITAG value and an interrupt ITAG value; generating the mask vector divided into mask sections comprising a plurality of elements with unset flags; for each mask section: if the mask section comprises the first ITAG value, setting a flag of an element in the mask section corresponding to the first ITAG value; if the mask section comprises the interrupt ITAG value, setting a flag of an element in the mask section corresponding to the interrupt ITAG value; setting each flag of each element in the mask vector between the element in the mask vector corresponding to the first ITAG value and the element in the mask vector corresponding to the interrupt ITAG value; and providing the mask vector to an instruction fetch unit.

17 Claims, 7 Drawing Sheets

(56) References Cited

U.S. PATENT DOCUMENTS

| | | | |
|---|---|---|---|
| 5,987,595 A | 11/1999 | Yoaz et al. | |
| 6,108,770 A | 8/2000 | Chrysos et al. | |
| 6,202,130 B1 | 3/2001 | Scales, III et al. | |
| 6,212,629 B1 * | 4/2001 | McFarland | G06F 9/30003 712/241 |
| 6,266,744 B1 | 7/2001 | Hughes et al. | |
| 6,393,544 B1 | 5/2002 | Bryg et al. | |
| 6,553,480 B1 * | 4/2003 | Cheong | G06F 9/3836 712/23 |
| 6,584,557 B1 | 6/2003 | Taylor | |
| 6,622,237 B1 | 9/2003 | Keller et al. | |
| 6,625,715 B1 | 9/2003 | Mathews | |
| 7,181,598 B2 | 2/2007 | Jourdan et al. | |
| 7,415,597 B2 | 8/2008 | Filippo et al. | |
| 7,600,099 B2 * | 10/2009 | Le | G06F 9/3824 712/220 |
| 7,689,812 B2 | 3/2010 | Abernathy et al. | |
| 7,711,929 B2 | 5/2010 | Burky et al. | |
| 7,958,336 B2 | 6/2011 | Lahav et al. | |
| 8,131,976 B2 | 3/2012 | Doing et al. | |
| 8,386,753 B2 | 2/2013 | Eisen et al. | |
| 8,516,230 B2 | 8/2013 | Chen et al. | |
| 8,892,841 B2 | 11/2014 | Gunna et al. | |
| 8,943,299 B2 | 1/2015 | Ekanadham et al. | |
| 8,966,232 B2 | 2/2015 | Tran | |
| 9,361,114 B1 * | 6/2016 | Tene | G06F 9/3861 |
| 9,513,926 B2 * | 12/2016 | Snyder, II | H04L 69/00 |
| 10,078,604 B1 * | 9/2018 | Cristobal | G06F 13/24 |
| 10,114,794 B2 | 10/2018 | Col et al. | |
| 2003/0065909 A1 | 4/2003 | Jourdan | |
| 2005/0228972 A1 | 10/2005 | Eisen et al. | |
| 2008/0082794 A1 | 4/2008 | Yu et al. | |
| 2009/0063823 A1 | 3/2009 | Burky et al. | |
| 2010/0205384 A1 | 8/2010 | Beaumont-Smith et al. | |
| 2010/0262813 A1 | 10/2010 | Brown et al. | |
| 2010/0262967 A1 | 10/2010 | Eisen et al. | |
| 2014/0129806 A1 | 5/2014 | Kaplan | |
| 2014/0281384 A1 | 9/2014 | Zeng | |
| 2015/0046690 A1 | 2/2015 | Eickemeyer et al. | |
| 2015/0120985 A1 | 4/2015 | Frey et al. | |
| 2015/0324204 A1 | 11/2015 | Eisen et al. | |
| 2017/0329607 A1 | 11/2017 | Eickemeyer et al. | |
| 2017/0329715 A1 | 11/2017 | Eickemeyer et al. | |
| 2017/0344368 A1 | 11/2017 | Levitan et al. | |
| 2017/0344378 A1 | 11/2017 | Giri et al. | |
| 2017/0344469 A1 | 11/2017 | Giri et al. | |

OTHER PUBLICATIONS

Motorola et al., "A Novel High-Effective Land Control Method in 3G Systems", An IP.com Prior Art Database Technical Disclosure (online), IP.com No. 000136665, URL: http://ip.com/IPCOM/000136665, dated May 26, 2006, 5 pages.

Gandhi et al., "Scalable Load and Store Processing in Latency Tolerant Processors", Proceedings of the 32$^{nd}$ International Symposium on Computer Architecture (ISCA'05), Jun. 2005, 12 pages, IEEE Computer Society, Piscataway, NJ.

Sinharoy, et al., "IBM POWER8 Processor Core Microarchitecture", IBM Journal of Research and Development, vol. 59, No. 1, Paper 2, Digital Object Identifier: 10.1147/JRD.2014.2376112, dated Jan./Feb. 2015, 21 pages.

Appendix P; List of IBM Patents of Application Treated as Related, Aug. 26, 2016, 2 pages.

Anonymous, "Thermometer Mask Generation Using log2(N)-1 bits", An IP.com Prior Art Database Technical Disclosure (online), IP.com No. 000228833, URL: http://ip.com/IPCOM/000228833, dated Jul. 9, 2013, 6 pages.

Anonymous, "Method and Apparatus for Early Fetch Redirection in a Computer Processor", An IP.com Prior Art Database Technical Disclosure (online), IP.com No. 000223643, URL: http://ip.com/IPCOM/000223643, dated Nov. 20, 2012, 6 pages.

U.S. Appl. No. 15/168,560, to David S. Levitan et al., entitled, *Identifying an Effective Address (EA) Using an Interrupt Instruction Tag (ITAG) in a Multi-Slice Processor,* assigned to International Business Machines Corporation, 40 pages.

U.S. Appl. No. 15/168,434, to Akash V. Giri et al., entitled, *Managing an Effective Address Table in a Multi-Slice Processor,* assigned to International Business Machines Corporation, 32 pages.

U.S. Appl. No. 15/155,327, to Richard J. Eickemeyer et al., entitled *Hazard Avoidance in a Multi-Slice Processor,* assigned to International Business Machines Corporation, 35 pages.

U.S. Appl. No. 15/220,028, to Richard J. Eickemeyer et al., entitled *Hazard Avoidance in a Multi-Slice Processor,* assigned to International Business Machines Corporation, 35 pages.

U.S. Appl. No. 15/220,798, to Akash V. Giri et al., entitled, *Managing an Effective Address Table in a Multi-Slice Processor,* assigned to International Business Machines Corporation, 32 pages.

* cited by examiner

GENERATING A MASK VECTOR FOR DETERMINING A PROCESSOR INSTRUCTION ADDRESS USING AN INSTRUCTION TAG IN A MULTI-SLICE PROCESSOR

BACKGROUND

Field of the Invention

The field of the invention is data processing, or, more specifically, methods, apparatus, and products for generating a mask vector for determining a processor instruction address using an instruction tag in a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for generating a mask vector for determining a processor instruction address using an instruction tag (ITAG) in a multi-slice processor. Generating a mask vector for determining a processor instruction address using an ITAG includes receiving a first ITAG value and an interrupt ITAG value; generating the mask vector divided into mask sections comprising a plurality of elements, each element comprising an unset flag; for each mask section: if the mask section comprises the first ITAG value, setting a flag of an element in the mask section corresponding to the first ITAG value; if the mask section comprises the interrupt ITAG value, setting a flag of an element in the mask section corresponding to the interrupt ITAG value; setting each flag of each element in the mask vector between the element in the mask vector corresponding to the first ITAG value and the element in the mask vector corresponding to the interrupt ITAG value; and providing the mask vector to an instruction fetch unit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
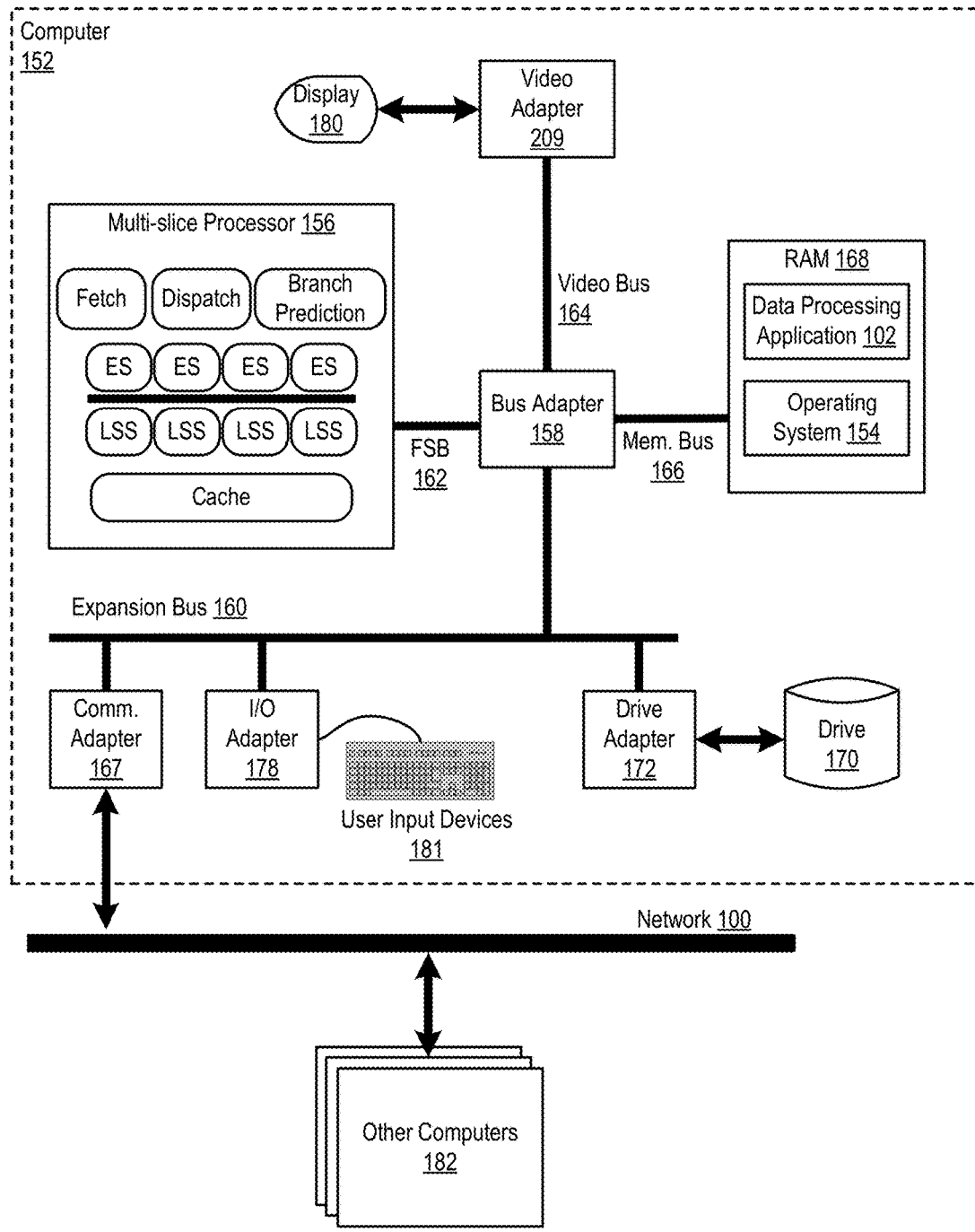
FIG. 1 sets forth an example system configured for generating a mask vector for determining a processor instruction address using an instruction tag (ITAG).

Exemplary methods, apparatus, and products for generating a mask vector for determining a processor instruction address using an instruction tag (ITAG) in accordance with the present invention are described with reference to the accompanying drawings, beginning with FIG. 1. FIG. 1 sets forth a network diagram of a system configured for generating a mask vector for determining a processor instruction address using an ITAG according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, a general purpose register (GPR), a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
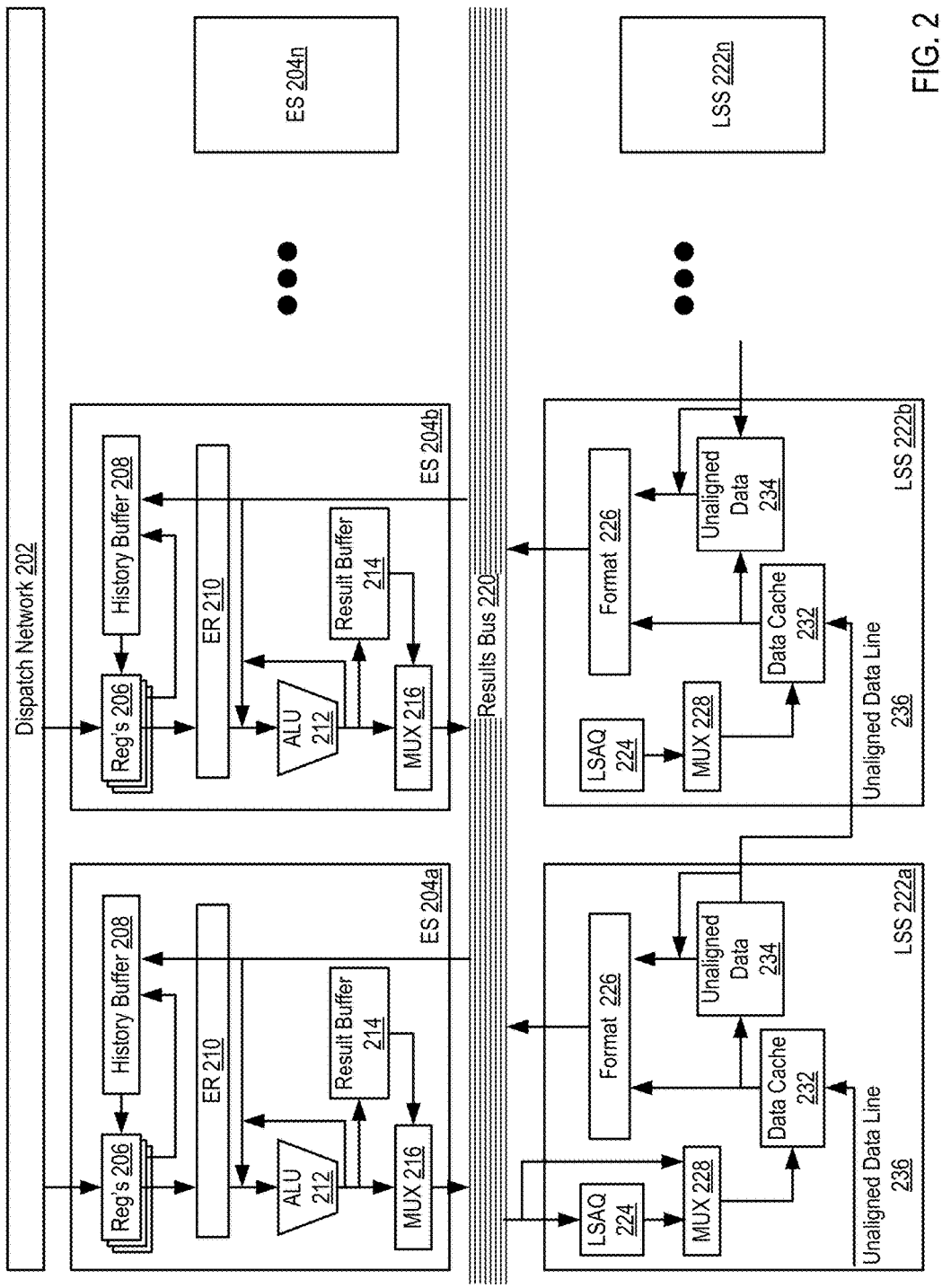
FIG. 2 sets forth an example system configured for generating a mask vector for determining a processor instruction address using an ITAG.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes a general purpose register (GPR) (206) and a history buffer (208). The general purpose register and history buffer may sometimes be referred to as the mapping facility, as the registers are utilized for register renaming and support logical registers.

The general purpose register (206) is configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
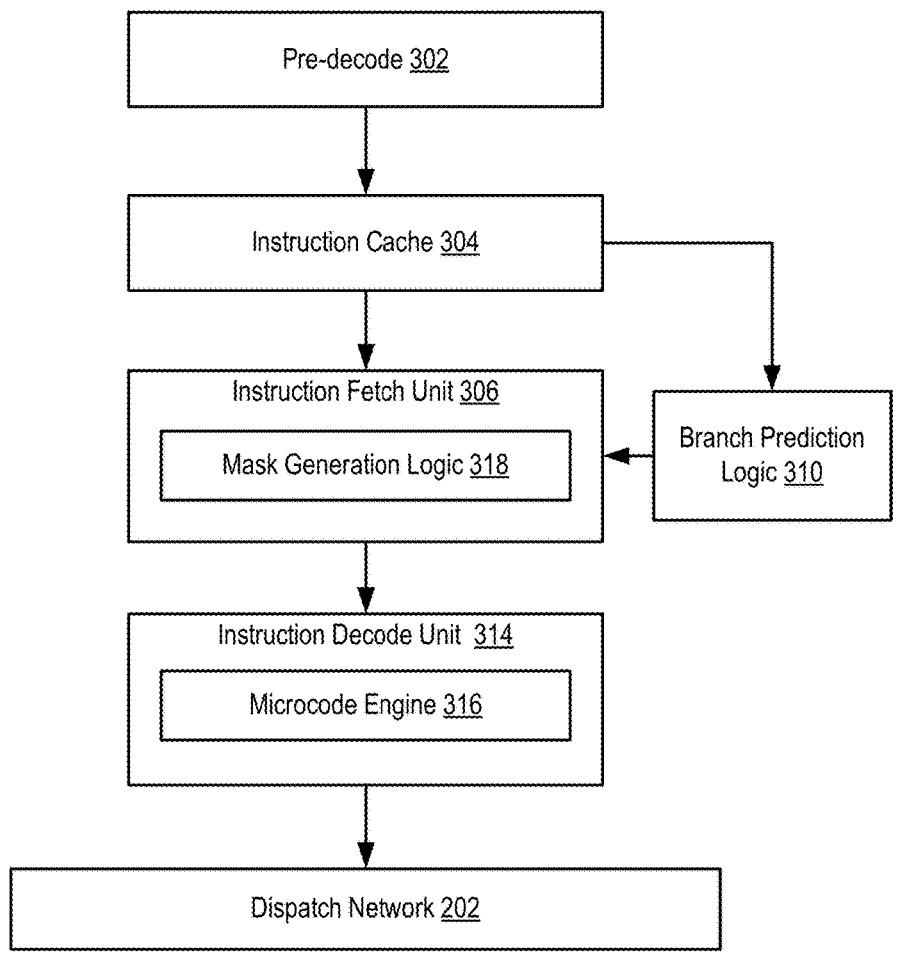
FIG. 3 sets forth an example system configured for generating a mask vector for determining a processor instruction address using an ITAG.

For further explanation, FIG. 3 sets forth a block diagram of another portion of a multi-slice processor according to embodiments of the present invention. The example multi-slice processor of FIG. 3 includes pre-decode logic (302) configured to retrieve instructions from memory, perform a preliminary decode of the instruction and store the pre-decoded instruction into an instruction cache (304).

The example multi-slice processor of FIG. 3 also includes branch prediction logic (310). Branch prediction logic generally performs branch prediction for pre-decoded instructions and tracks various branch prediction statistics for executing and executed instructions. The branch prediction logic (310) may include or access various registers and storage that contain such branch prediction statistics. Examples of storage entities may include global branch history tables and the like.

The example multi-slice processor of FIG. 3 also includes an instruction fetch unit (306). An instruction fetch unit (306) generally retrieves instructions from the instruction cache and provides the fetched instruction to instruction decode logic (308). The instruction fetch unit (306) includes mask generation logic (318). The mask generation logic (318) generates a mask vector to aid the instruction fetch unit (306) in determining an effective address for a given instruction tag (ITAG).

The example instruction decode unit (314) of FIG. 3 performs a final decode operation on the fetched instructions and provides the decoded instructions to the dispatch network (202). The example instruction decode unit (314) of FIG. 3 also includes a microcode engine (316). The microcode engine generally performs a portion of decoding an instruction in which machine code is translated into hardware-level instructions. Additionally, as described below in greater detail, the example microcode engine of FIG. 3 may also assist in the performance of thread migration in the multi-slice processor. The dispatch network as described above, dispatches the decoded instructions among slices.

Figure 4:
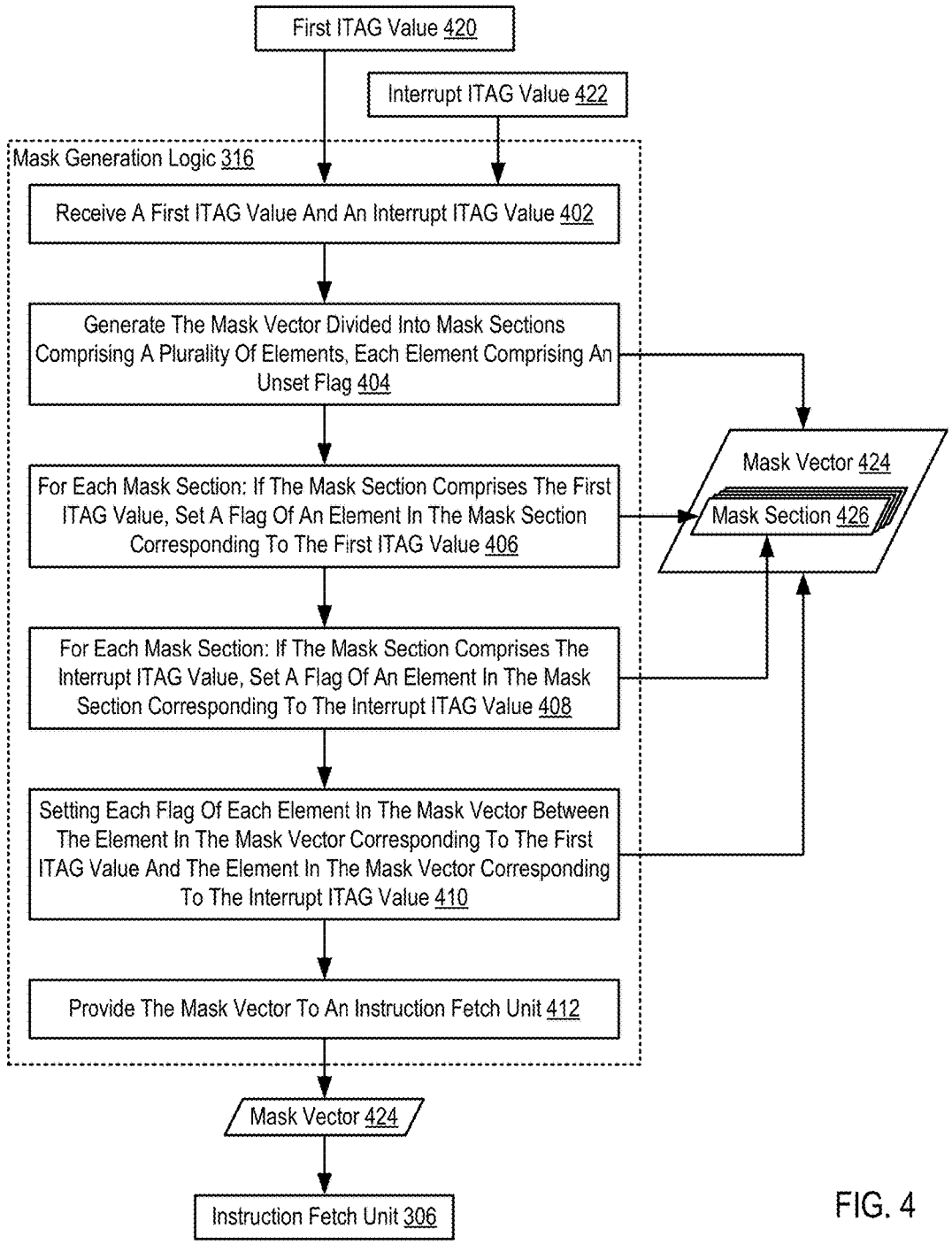
FIG. 4 sets forth a flow chart illustrating an exemplary method for generating a mask vector for determining a processor instruction address using an ITAG.

For further explanation, FIG. 4 sets forth a flow chart illustrating a further exemplary method for generating a mask vector for determining a processor instruction address using an instruction tag (ITAG) according to embodiments of the present invention that includes receiving (402) a first instruction tag (ITAG) value (420) and an interrupt ITAG value (422). An ITAG is an instruction identifier. Each ITAG tracks an internal instruction from decode to completion. Each internal instruction may be assigned an ITAG by an ITAG assignment unit, which assigns ITAGs sequentially to internal instructions before the internal instructions are transmitted to a dispatch unit.

Internal operations are the result of decoding processor instructions, and each internal operation is tracked using an ITAG. Processor instructions may be decoded into a single internal operation or may be decoded into a plurality of internal operations. Processor instructions, from which the internal operations are generated, are stored using effective addresses. The effective address of a processor instruction may not be tracked outside of the instruction fetch unit (306). Elements outside of the instruction fetch unit (306) may reference a processor instruction using an ITAG assigned to one or more internal operations generated from the processor instruction.

An instruction fetch unit (306) may be tasked with determining an effective address for an interrupt ITAG. Specifically, the instruction fetch unit (306) may be required to obtain the processor operation that generated an internal operation assigned the interrupt ITAG. An interrupt ITAG is an ITAG assigned to an internal operation that the instruction fetch unit (306) uses as a reference point to begin to refetch processor instructions. In order to determine an effective address for an interrupt ITAG, the instruction fetch unit (306) generates a mask vector (424) to apply to a processor instruction vector in order to efficiently determine the number of processor instructions decoded into the internal operations assigned the set of ITAGs defined by the first ITAG and the interrupt ITAG. The first ITAG refers to the first ITAG in a set of ITAGs that includes the interrupt ITAG. This set of ITAGs has been assigned to a set of internal operations generated from a set of processor instructions.

An ITAG value is the numerical equivalent of the ITAG. An ITAG may be implemented as a set of binary bits, and therefore the ITAG value may be the numerical equivalent of the set of bits. For example, an ITAG may be implemented as eight binary bits (e.g., '00001110'), and the ITAG value is the numerical equivalent of the bits (e.g., '00001110' or '14').

Receiving (402) a first ITAG value (420) and an interrupt ITAG value (422) may be carried out by the instruction fetch unit (306) obtaining the first ITAG using an interrupt ITAG and an effective address table (EAT). An EAT may include a number of EAT rows, each EAT row including a range of effective addresses and a first ITAG. Given an interrupt ITAG value (422), a first ITAG value (420) may be obtained by selecting the EAT row that includes the interrupt ITAG value (422) and retrieving the first ITAG value (420) from that EAT row. Once the first ITAG is obtained, the first ITAG value and the interrupt ITAG value are provided to the mask generation logic (316) in order to generate a mask vector (424).

FIG. 4 also includes generating (404) the mask vector (424) divided into mask sections (426) comprising a plurality of elements, each element comprising an unset flag. Generating (404) the mask vector (424) divided into mask sections (426) comprising a plurality of elements, each element comprising an unset flag may be carried out by generating a mask vector equivalent in size to the processor instruction vector. For example, the processor instruction vector may include 256 elements and the mask vector may therefore be generated with 256 elements. Each element in the mask vector (424) may be implemented as a binary bit. An element with an unset flag may be implemented as a binary bit set to 'down' or '0'. For example, a mask vector may be generated as 32 '0' bits, or '00000000000000000000000000000000'.

Each element of the mask vector (424) may also be associated with an entry address. The entry address of the element is the position, address, or location within the mask vector (424) at which the element is placed relative to the other elements. For example, the mask vector may be a sequence of binary bits, and each binary bit may be associated with an entry address describing its numerical position in the vector. In such an example, the first element may have an entry address of '0' or '00000000', and the 128$^{th}$ element may have an entry address of '127' or '01111111'.

Each mask section (426) may be an equal size fraction of the mask vector (424). For example, a mask vector (424) with 256 elements may be divided into four mask sections of 64 elements each or eight mask sections of 32 elements each. Further, each mask section (426) may correspond to an amount of data executable in a logic function during a single processor cycle. For example, two 32-bit mask sections (426) may be processed per cycle. Further, the size of the section may be selected based on the sizes of other elements in the process, such as the number of ITAGs in an EAT row.

For example, an EAT row may generally have 33 ITAGs or less, and the mask vector (424) may be divided into 32-bit mask sections (426). If two mask sections are processed during a single cycle, and assuming the distance between the first ITAG and interrupt ITAG is less than or equal to 33 bits in the vector, then then mask vector (424) may be completed in a single cycle. Specifically, the first ITAG may be found in the first mask section and the interrupt ITAG may be found in the second mask section. In this example, on average, generating the mask vector (424) may be completed by processing 48 bits of the vector (16 bits from the first mask section and 32 bits from the second mask section). Further, in some cases, each ITAG of an EAT row may be set in the mask vector (424), and the mask generation may take a greater amount of cycles to complete (e.g., four cycles to generate the mask vector (424)).

FIG. 4 also includes, for each mask section (426), if the mask section (426) comprises the first ITAG value, setting (406) a flag of an element in the mask section corresponding to the first ITAG value (420). Setting (406) a flag of an element in the mask section corresponding to the first ITAG value (420) may be carried out by determining whether the mask section (426) comprises an element with an entry address that corresponds to the first ITAG value, identifying the element that corresponds to the first ITAG value, and setting the flag for that element.

FIG. 4 also includes, for each mask section (426), if the mask section comprises the interrupt ITAG value (422), setting (408) a flag of an element in the mask section corresponding to the interrupt ITAG value. Setting (408) a flag of an element in the mask section corresponding to the interrupt ITAG value (422) may be carried out by determining whether the mask section (426) comprises an element with an entry address that corresponds to the interrupt ITAG value, identifying the element that corresponds to the interrupt ITAG value, and setting the flag for that element. Further, setting (408) a flag of an element in the mask section corresponding to the interrupt ITAG value (422) may be carried out by setting a flag of the element just previous to the element in the mask section corresponding to the interrupt ITAG value (422). For example, if the mask vector (426) is intended to include flags set for each element beginning with the first ITAG value (420) and ending with, but not including, the interrupt ITAG value (422), then the element corresponding to the interrupt ITAG value (422) may be left unset, and instead the flag of the element just previous to the element corresponding to the interrupt ITAG value (422) may be set instead.

Figure 5:
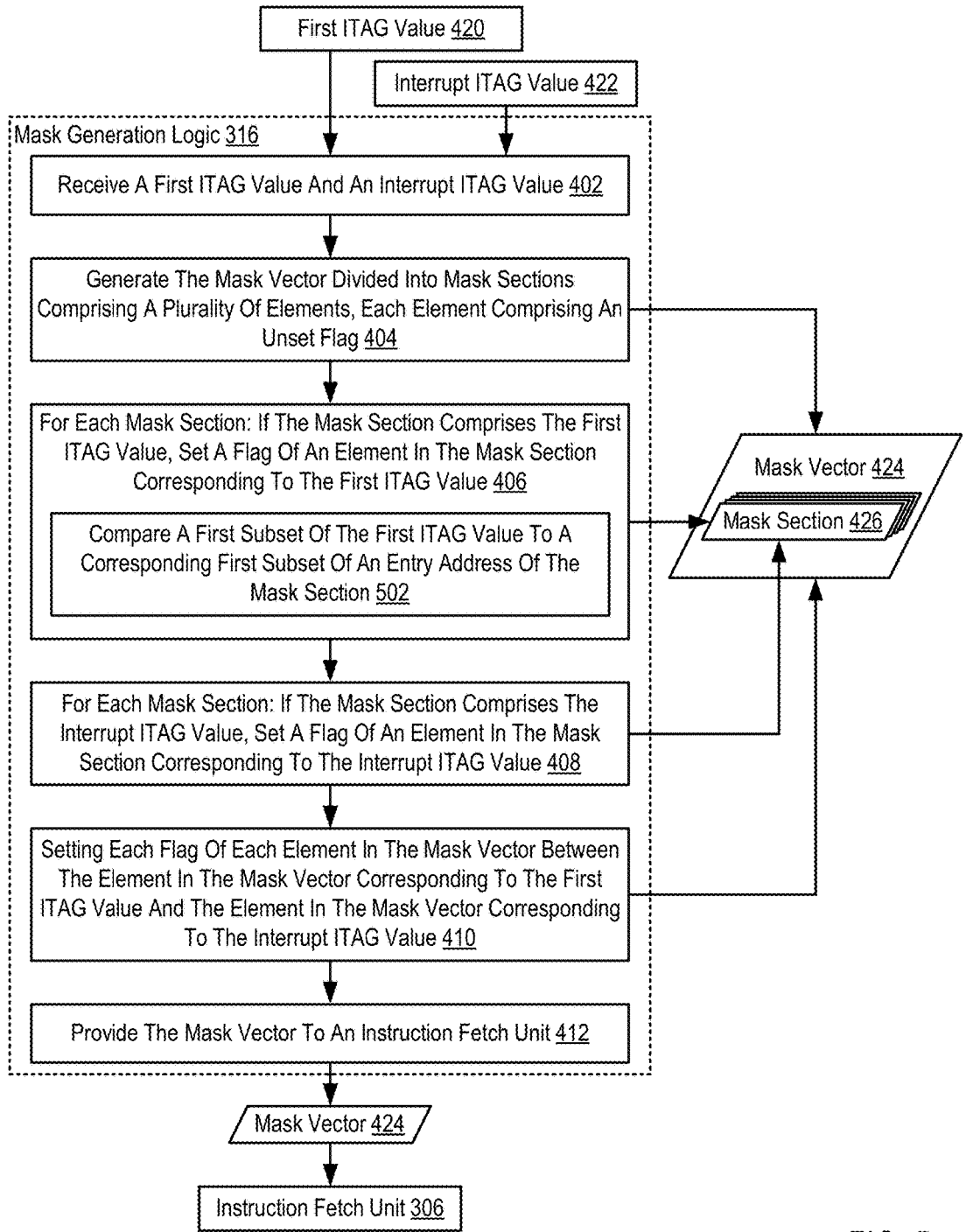
FIG. 5 sets forth a flow chart illustrating an exemplary method for generating a mask vector for determining a processor instruction address using an ITAG.
Figure 6:
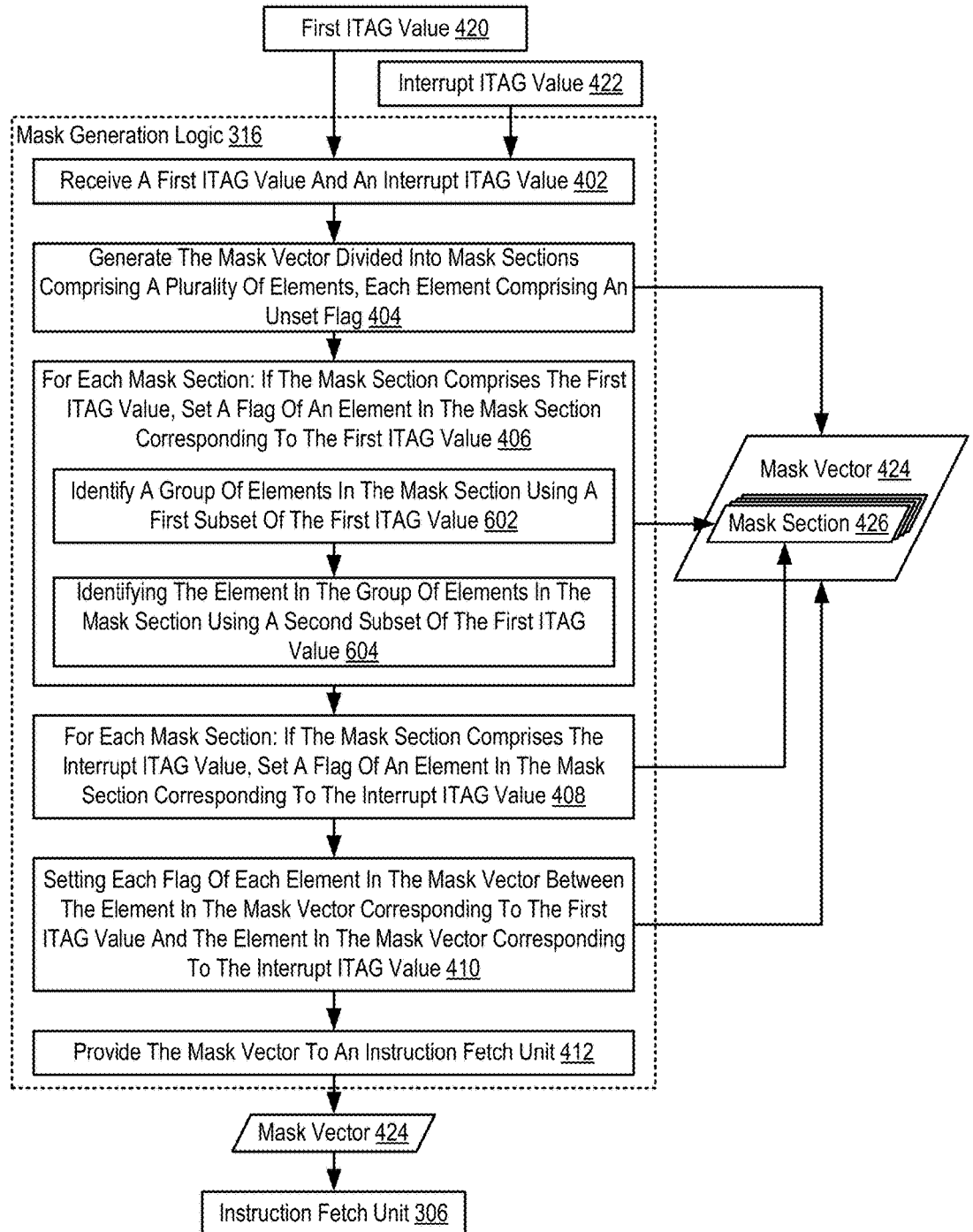
FIG. 6 sets forth a flow chart illustrating an exemplary method for generating a mask vector for determining a processor instruction address using an ITAG.

The same methods for determining whether a mask section (424) includes the first ITAG value and setting (406) a flag of an element in the mask section corresponding to the first ITAG value (420) may be performed using the interrupt ITAG value, including the methods described with regard to FIGS. 5 and 6.

FIG. 4 also includes setting (410) each flag of each element in the mask vector (424) between the element in the mask vector corresponding to the first ITAG value and the element in the mask vector corresponding to the interrupt ITAG value. Setting (410) each flag of each element in the mask vector (424) between the element in the mask vector corresponding to the first ITAG value and the element in the mask vector corresponding to the interrupt ITAG value may be carried out by identifying the set of elements between the elements with entry addresses that correspond to the first ITAG value and the interrupt ITAG value, and setting the flags of each of the elements.

For example, assume that the first ITAG value received is '10001110' and the interrupt ITAG value received is '10010100'. Therefore, setting (410) each flag of each element in the mask vector (424) between the element in the mask vector corresponding to the first ITAG value and the element in the mask vector corresponding to the interrupt ITAG value would include setting the flag of each element corresponding to the entry addresses between '10001110' and '10010100'.

Setting (410) each flag of each element in the mask vector (424) between the element in the mask vector corresponding to the first ITAG value and the element in the mask vector corresponding to the interrupt ITAG value may also be carried out by setting the flag of each element in the mask sections between the mask sections containing the element corresponding to the first ITAG value and the mask section containing the element corresponding to the interrupt ITAG value. For example, if the element corresponding to the first ITAG value is in the first mask section, and the element corresponding to the interrupt ITAG value (or the element just previous to the element corresponding to the interrupt ITAG value) is in the fourth mask section, then the flags of each element in the second and third mask sections are set.

FIG. 4 also includes providing (412) the mask vector (424) to an instruction fetch unit (306). Providing (412) the mask vector (424) to an instruction fetch unit (306) may be carried out by applying the mask vector (424) to a processor instruction vector once each element in the mask vector (424) has been set according to the mask generation logic (316). Using the 32-bit long example mask vector from above, the final mask vector provided to the instruction fetch unit (306) may be '00000000000000001111111100000000'. Providing (412) the mask vector (424) to an instruction fetch unit (306) may also be carried out by providing one mask section (426), or pair of mask sections, to the instruction fetch unit (306) each cycle. The mask vector (424) may be applied to a processor instruction vector one mask section (or pair of mask sections) during each cycle.

During transmit time, as processor instructions are decoded, each assigned ITAG is sent to an instruction decode unit with an indication regarding whether the ITAG should be associated with a processor instruction. The instruction decode unit collects the ITAGs and indications into the processor instruction vector. Each element in the processor instruction vector corresponds to an ITAG assigned to an internal instruction generated from a processor instruction. Each group of elements corresponding to a group of ITAGs generated from a single processor instruction will have a single flag set among the elements, representing the processor instruction.

For example, if one processor instruction is decoded into 10 internal operations assigned 10 ITAGs, the processor instruction vector includes 10 elements corresponding to the 10 ITAGs, and one of the 10 elements will have a flag set (e.g., the last element). The remaining 9 elements will not have the flag set (e.g., the first 9 elements). Represented as a bit vector, this example may be expressed as "0000000001". The next processor instruction may be decoded into 1 internal operation and assigned 1 ITAG. An additional element is then added to the processor instruction vector, and the flag for that element is set. The combined example processor instruction vector, represented as a bit vector, may then be expressed as "00000000011". Alternatively, this example may first be expressed as "1000000000". The next processor instruction may be decoded into 1 internal operation and assigned 1 ITAG. An additional element is then added to the processor instruction vector, and the flag for that element is set. The combined example processor instruction vector, represented as a bit vector, may then be expressed as "10000000001".

The mask vector may be applied to the processor instruction vector to mask each element of the processor instruction vector except those elements that correspond to the range of ITAGs that begin with the first ITAG and end with the interrupt ITAG. For example, a mask vector (424) may include a number of elements each corresponding to the elements in a processor instruction vector. The mask vector (424) may have a set of flags set on a group of elements that correspond to a subset or portion of the processor instruction vector that corresponds to the range of ITAGs that begins with the first ITAG and includes or ends with the interrupt ITAG.

As discussed above, the processor instruction vector may include one element for each internal operation decoded from one or more processor instruction. Each element with a set flag in the processor instruction vector may correspond to one processor instruction, and the group of element with unset flags preceding the element with the set flag may correspond to all other internal operations decoded from that processor instruction. Consequently, the number of set flags within the processor instruction vector will correspond to the number of processor instructions decoded to generate the group of internal operations. With the knowledge of which elements correspond to the interrupt ITAG value (422) and the first ITAG value (420), an offset number of processor instructions may be derived by determining the number of elements with set flags between the interrupt ITAG value (422) and the first ITAG value (420).

The mask vector (424) may be applied to the processor instruction vector in order to extract only the elements between the element corresponding to the first ITAG value (420) and the element corresponding to the interrupt ITAG value (422). The number of set flags in the extracted elements may be used as an offset. With the knowledge of the EA for the processor instruction decoded into the internal operation assigned the first ITAG value (420), the EA for the processor instruction decoded into the internal operation assigned the interrupt ITAG value (422) may be derived using the offset.

For further explanation, FIG. 5 sets forth a flow chart illustrating a further exemplary method for generating a mask vector for determining a processor instruction address using an ITAG according to embodiments of the present invention that includes receiving (402) a first ITAG value (420) and an interrupt ITAG value (422); generating (404) the mask vector (424) divided into mask sections (426) comprising a plurality of elements, each element comprising an unset flag; for each mask section (426): if the mask section comprises the first ITAG value (420), setting (406) a flag of an element in the mask section (426) corresponding to the first ITAG value; if the mask section (426) comprises the interrupt ITAG value (422), setting (408) a flag of an element in the mask section (426) corresponding to the interrupt ITAG value; setting (410) each flag of each element in the mask vector (424) between the element in the mask vector corresponding to the first ITAG value and the element in the mask vector corresponding to the interrupt ITAG value; and providing (412) the mask vector (424) to an instruction fetch unit (306).

The method of FIG. 5 differs from the method of FIG. 4, however, in that if the mask section comprises the first ITAG value, setting (406) a flag of an element in the mask section corresponding to the first ITAG value (420) includes comparing (502) a first subset of the first ITAG value to a corresponding first subset of an entry address of the mask section. Comparing (502) a first subset of the first ITAG value to a corresponding first subset of an entry address of the mask section may be carried out by comparing one or more bits of the first ITAG value to the corresponding one or more bits of an entry address of an element or set of elements in a mask section.

Consider the following example. A mask vector may be generated as a 256-bit vector, with each element associated with an entry address from '00000000' to '11111111'. Each mask section (426) may be 64-bits long, with the first mask section associated with entry addresses '00000000' through '00111111', the second mask section associated with entry addresses '01000000' through '01111111', the third mask section associated with entry addresses '10000000' through '10111111', and the fourth mask section associated with entry addresses '11000000' through '11111111'.

A first ITAG value may be received as '10001110'. The mask generation logic (316) may compare the first and second element (i.e., the first and second bit) of the first ITAG value (e.g., '10') with the first and second bit of each range of addresses for each mask section. Based upon the comparison, the mask generation logic (316) determines that the third mask section (with entry addresses '10000000' through '10111111') comprises the first ITAG value. The first, second, and fourth mask sections are determined to not comprise the first ITAG value.

Comparing (502) a first subset of the first ITAG value to a corresponding first subset of an entry address of the mask section may be an iterative process. Specifically, once the mask section is determined, a further comparison may be made to determine a further subset of the mask section that comprises the first ITAG value. Continuing with the example above, the mask generation logic (316) may compare the third bit of the first ITAG value (i.e., '0') to the first 32-bit range of entry addresses in the mask section (i.e., '10000000' through '10011111') and second 32-bit range of entry address (i.e., '10100000' through '10111111') to determine that the first 32-bit range comprises the first ITAG value.

The mask generation logic (316) may narrow the portion of the mask vector (424) to a mask section (426) (e.g., a 64-bit vector) and process each half of the mask section (426) in parallel. For example, one 32-bit half of the mask section (426) may be processes during the same cycle as the other 32-bit half of the mask section (426). Once each half has been processed to determine an element in the half mask section that may correspond to the first ITAG value, the correct half of the mask section (426) may be determined using one or more elements of the first ITAG value (420) (e.g., using the third element of the first ITAG value as described above).

The process described above for comparing (502) a first subset of the first ITAG value to a corresponding first subset of an entry address of the mask section may also be performed to obtain corresponding results using a first subset of the interrupt ITAG value.

For further explanation, FIG. 6 sets forth a flow chart illustrating a further exemplary method for generating a mask vector for determining a processor instruction address using an ITAG according to embodiments of the present invention that includes receiving (402) a first ITAG value (420) and an interrupt ITAG value (422); generating (404) the mask vector (424) divided into mask sections (426) comprising a plurality of elements, each element comprising an unset flag; for each mask section (426): if the mask section comprises the first ITAG value (420), setting (406) a flag of an element in the mask section (426) corresponding to the first ITAG value; if the mask section (426) comprises the interrupt ITAG value (422), setting (408) a flag of an element in the mask section (426) corresponding to the interrupt ITAG value; setting (410) each flag of each element in the mask vector (424) between the element in the mask vector corresponding to the first ITAG value and the element in the mask vector corresponding to the interrupt ITAG value; and providing (412) the mask vector (424) to an instruction fetch unit (306).

The method of FIG. 6 differs from the method of FIG. 4, however, in that if the mask section comprises the first ITAG value (420), setting (406) a flag of an element in the mask section (426) corresponding to the first ITAG value includes identifying (602) a group of elements in the mask section using a first subset of the first ITAG value; and identifying (604) the element in the group of elements in the mask section using a second subset of the first ITAG value.

Each mask section (426) may be divided into groups. For example, a mask section that is made up of 32 elements may include four groups of eight elements each. Identifying (602) a group of elements in the mask section using a first subset of the first ITAG value may be carried out by using one or more elements of the first ITAG value to identify one group of elements from a collection of elements that makes up a mask section. Continuing the example above, the fourth and fifth bits of the ITAG value implemented as the eight-bit vector '10001110' (i.e., '01') may be used to identify an eight-bit group of elements from a 32-bit mask section. Specifically, the four groups may include a first group corresponding to entry addresses '10000000' through '10000111', a second group corresponding to entry addresses '10001000' through '10001111', a third group corresponding to entry addresses '10010000' through '10010111', and a fourth group corresponding to entry addresses '10011000' through '10011111'. Using the fourth and fifth bits of the ITAG value implemented as the eight-bit vector '10001110' (i.e., '01'), the mask generation logic (316) identifies the second group as the group including entry addresses corresponding to the first ITAG value (420).

Identifying (604) the element in the group of elements in the mask section using a second subset of the first ITAG value may be carried out by using one or more elements of the first ITAG value to identify an element from a group of elements that corresponds to the first ITAG value. Continuing with the example above, the sixth, seventh, and eighth bits of the ITAG value implemented as the eight-bit vector '10001110' (i.e., '110') may be used to identify one element from the eight-bit group of elements. Specifically, the group may include entry addresses '10001000' through '10001111'. Using the sixth, seventh, and eighth bits of the ITAG value implemented as the eight-bit vector '10001110' (i.e., '110'), the mask generation logic (316) identifies the sixth element as the element corresponding to the first ITAG value (420). The flag is then set for the sixth element in the second group of the third mask section (426).

The process described above for identifying (602) a group of elements in the mask section using a first subset of the first ITAG value and identifying (604) the element in the group of elements in the mask section using a second subset of the first ITAG value may also be performed to obtain corresponding results using a first subset of the interrupt ITAG value.

Figure 7:
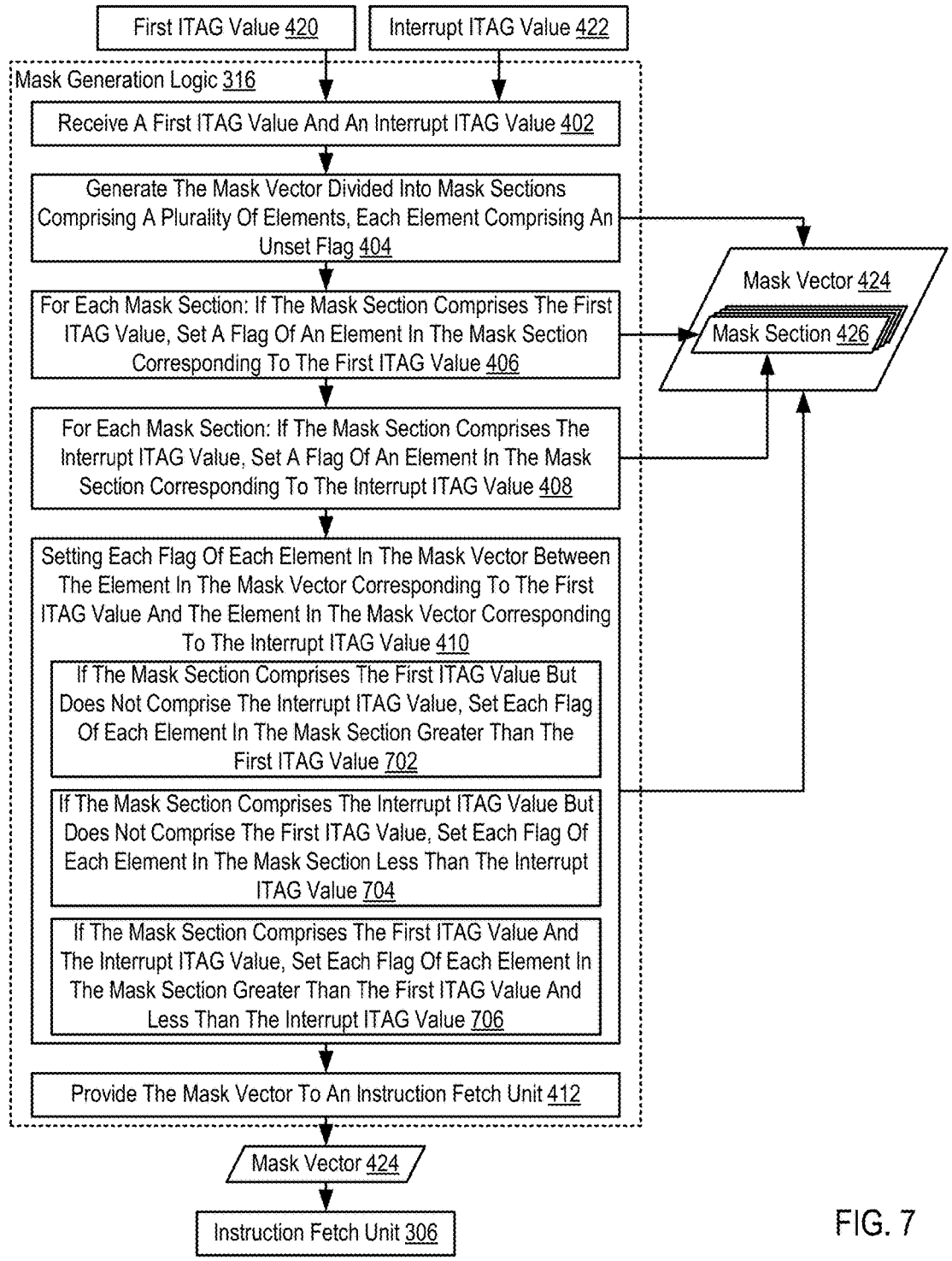
FIG. 7 sets forth a flow chart illustrating an exemplary method for generating a mask vector for determining a processor instruction address using an ITAG.

For further explanation, FIG. 7 sets forth a flow chart illustrating a further exemplary method for generating a mask vector for determining a processor instruction address using an ITAG according to embodiments of the present invention that includes receiving (402) a first ITAG value (420) and an interrupt ITAG value (422); generating (404) the mask vector (424) divided into mask sections (426) comprising a plurality of elements, each element comprising an unset flag; for each mask section (426): if the mask section comprises the first ITAG value (420), setting (406) a flag of an element in the mask section (426) corresponding to the first ITAG value; if the mask section (426) comprises the interrupt ITAG value (422), setting (408) a flag of an element in the mask section (426) corresponding to the interrupt ITAG value; setting (410) each flag of each element in the mask vector (424) between the element in the mask vector corresponding to the first ITAG value and the element in the mask vector corresponding to the interrupt ITAG value; and providing (412) the mask vector (424) to an instruction fetch unit (306).

The method of FIG. 7 differs from the method of FIG. 4, however, in that setting (410) each flag of each element in the mask vector (424) between the element in the mask vector corresponding to the first ITAG value and the element in the mask vector corresponding to the interrupt ITAG value includes, if the mask section comprises the first ITAG value but does not comprise the interrupt ITAG value, setting (702) each flag of each element in the mask section greater than the first ITAG value; if the mask section comprises the interrupt ITAG value but does not comprise the first ITAG value, setting (704) each flag of each element in the mask section less than the interrupt ITAG value; and if the mask section comprises the first ITAG value and the interrupt ITAG value, setting (706) each flag of each element in the mask section greater than the first ITAG value and less than the interrupt ITAG value.

If the mask section comprises the first ITAG value but does not comprise the interrupt ITAG value, setting (702) each flag of each element in the mask section greater than the first ITAG value may be carried out by determining that the mask section includes an element with an entry address that corresponds to the first ITAG value but does not include an element with an entry address that corresponds to the interrupt ITAG value, and setting the flag of each element greater than the entry address that corresponds to the first ITAG value. For example, in a mask vector comprising binary bits, each bit with an entry address greater than the entry address corresponding to the first ITAG value is altered to an 'up' or '1' bit. Because the first ITAG is so identified because it is the first ITAG is a range of ITAGs that includes the interrupt ITAG, the interrupt ITAG value is greater than the first ITAG value.

If the mask section comprises the interrupt ITAG value but does not comprise the first ITAG value, setting (704) each flag of each element in the mask section less than the interrupt ITAG value may be carried out by determining that the mask section includes an element with an entry address that corresponds to the interrupt ITAG value but does not include an element with an entry address that corresponds to the first ITAG value, and setting the flag of each element less than the entry address that corresponds to the interrupt ITAG value. For example, in a mask vector comprising binary bits, each bit with an entry address less than the entry address corresponding to the interrupt ITAG value is altered to an 'up' or '1' bit.

If the mask section comprises the first ITAG value and the interrupt ITAG value, setting (706) each flag of each element in the mask section greater than the first ITAG value and less than the interrupt ITAG value may be carried out by determining that the mask section includes an element with an entry address that corresponds to the first ITAG value and also includes an element with an entry address that corresponds to the first ITAG value, and setting the flag of each element greater than the entry address that corresponds to the first ITAG value and less than the entry address that corresponds to the interrupt ITAG value. For example, in a mask vector comprising binary bits, each bit with an entry address greater than the entry address corresponding to the first ITAG value and less than the entry address corresponding to the interrupt ITAG value is altered to an 'up' or '1' bit.

If the mask section does not comprise either the first ITAG value or interrupt ITAG value, each flag of the elements of the mask section is left unset or all flags are set. Specifically, if each entry address in the mask section is less than the first ITAG value, or if each entry address in the mask section is greater than the interrupt ITAG value, then all flags are left unset. If each entry address in the mask section is greater than the first ITAG value and less than the interrupt ITAG value, then all flags are set.

Exemplary embodiments of the present invention are described largely in the context of a fully functional computer system for generating a mask vector for determining a processor instruction address using an ITAG. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of generating a mask vector for determining a processor instruction address using an instruction tag (ITAG), the method comprising:
   receiving a first ITAG value and an interrupt ITAG value;
   generating a mask vector divided into mask sections comprising a plurality of elements, each element of the mask vector associated with an entry address, each element comprising an unset flag;
   for each mask section of the mask vector:
      for the mask section comprising the first ITAG value, setting a flag of an element in a mask section in the mask vector corresponding to the first ITAG value; and
      for the mask section comprising the interrupt ITAG value, setting a flag of an element in a mask section in the mask vector corresponding to the interrupt ITAG value;
   setting each flag of each element in the mask vector between the element in the mask vector corresponding to the first ITAG value and the element in the mask vector corresponding to the interrupt ITAG value, wherein setting each flag comprises, for each mask section:
      if the mask section comprises the first ITAG value but does not comprise the interrupt ITAG value, setting each flag of each element in the mask section greater than the first ITAG value;
      if the mask section comprises the interrupt ITAG value but does not comprise the first ITAG value, setting each flag of each element in the mask section less than the interrupt ITAG value; and
      if the mask section comprises the first ITAG value and the interrupt ITAG value, setting each flag of each element in the mask section greater than the first ITAG value and less than the interrupt ITAG value; and
   providing the mask vector to an instruction fetch unit to be applied to a processor instruction vector to mask each element of the processor instruction vector except those elements that correspond to the range of ITAGs that begin with the first ITAG value and end with the interrupt ITAG value.

2. The method of claim 1, wherein determining whether the mask section comprises the first ITAG value comprises:
comparing a first subset of the first ITAG value to a corresponding first subset of an entry address of the mask section.

3. The method of claim 1, wherein setting a flag of an element in the mask section corresponding to the first ITAG value comprises:
identifying a group of elements in the mask section using a first subset of the first ITAG value; and
identifying the element in the group of elements in the mask section using a second subset of the first ITAG value.

4. The method of claim 1, wherein a size of each mask section corresponds to an amount of data a multi-slice processor is able to process in one cycle.

5. The method of claim 1, wherein a size of the mask vector corresponds to an amount of ITAGs issued by a multi-slice processor.

6. The method of claim 1, wherein the first ITAG value and the interrupt ITAG value comprise a set of binary values.

7. A multi-slice computer processor for generating a mask vector for determining a processor instruction address using an instruction tag (ITAG), the multi-slice computer processor configured for:
receiving a first ITAG value and an interrupt ITAG value;
generating a mask vector divided into mask sections comprising a plurality of elements, each element of the mask vector associated with an entry address, each element comprising an unset flag;
for each mask section of the mask vector:
for the mask section comprising the first ITAG value, setting a flag of an element in a mask section in the mask vector corresponding to the first ITAG value; and
for the mask section comprising the interrupt ITAG value, setting a flag of an element in a mask section in the mask vector corresponding to the interrupt ITAG value;
setting each flag of each element in the mask vector between the element in the mask vector corresponding to the first ITAG value and the element in the mask vector corresponding to the interrupt ITAG value, wherein setting each flag comprises, for each mask section:
if the mask section comprises the first ITAG value but does not comprise the interrupt ITAG value, setting each flag of each element in the mask section greater than the first ITAG value;
if the mask section comprises the interrupt ITAG value but does not comprise the first ITAG value, setting each flag of each element in the mask section less than the interrupt ITAG value; and
if the mask section comprises the first ITAG value and the interrupt ITAG value, setting each flag of each element in the mask section greater than the first ITAG value and less than the interrupt ITAG value; and
providing the mask vector to an instruction fetch unit to be applied to a processor instruction vector to mask each element of the processor instruction vector except those elements that correspond to the range of ITAGs that begin with the first ITAG value and end with the interrupt ITAG value.

8. The multi-slice computer processor of claim 7, wherein determining whether the mask section comprises the first ITAG value comprises:
comparing a first subset of the first ITAG value to a corresponding first subset of an entry address of the mask section.

9. The multi-slice computer processor of claim 7, wherein setting a flag of an element in the mask section corresponding to the first ITAG value comprises:
identifying a group of elements in the mask section using a first subset of the first ITAG value; and
identifying the element in the group of elements in the mask section using a second subset of the first ITAG value.

10. The multi-slice computer processor of claim 7, wherein a size of each mask section corresponds to an amount of data a multi-slice processor is able to process in one cycle.

11. The multi-slice computer processor of claim 7, wherein a size of the mask vector corresponds to an amount of ITAGs issued by a multi-slice processor.

12. The multi-slice computer processor of claim 7, wherein the first ITAG value and the interrupt ITAG value comprise a set of binary values.

13. A computing system, the computing system including a multi-slice computer processor for generating a mask vector for determining a processor instruction address using an instruction tag (ITAG), the multi-slice computer processor configured for:
receiving a first ITAG value and an interrupt ITAG value;
generating a mask vector divided into mask sections comprising a plurality of elements, each element of the mask vector associated with an entry address, each element comprising an unset flag;
for each mask section of the mask vector:
for the mask section comprising the first ITAG value, setting a flag of an element in a mask section in the mask vector corresponding to the first ITAG value; and
for the mask section comprising the interrupt ITAG value, setting a flag of an element in a mask section in the mask vector corresponding to the interrupt ITAG value;
setting each flag of each element in the mask vector between the element in the mask vector corresponding to the first ITAG value and the element in the mask vector corresponding to the interrupt ITAG value, wherein setting each flag comprises, for each mask section:
if the mask section comprises the first ITAG value but does not comprise the interrupt ITAG value, setting each flag of each element in the mask section greater than the first ITAG value;
if the mask section comprises the interrupt ITAG value but does not comprise the first ITAG value, setting each flag of each element in the mask section less than the interrupt ITAG value; and
if the mask section comprises the first ITAG value and the interrupt ITAG value, setting each flag of each element in the mask section greater than the first ITAG value and less than the interrupt ITAG value; and
providing the mask vector to an instruction fetch unit to be applied to a processor instruction vector to mask each element of the processor instruction vector except those elements that correspond to the range of ITAGs that begin with the first ITAG value and end with the interrupt ITAG value.

14. The computing system of claim 13, wherein determining whether the mask section comprises the first ITAG value comprises:
comparing a first subset of the first ITAG value to a corresponding first subset of an entry address of the mask section.

15. The computing system of claim 13, wherein setting a flag of an element in the mask section corresponding to the first ITAG value comprises:
identifying a group of elements in the mask section using a first subset of the first ITAG value; and
identifying the element in the group of elements in the mask section using a second subset of the first ITAG value.

16. The computing system of claim 13, wherein a size of each mask section corresponds to an amount of data a multi-slice processor is able to process in one cycle.

17. The computing system of claim 13, wherein a size of the mask vector corresponds to an amount of ITAGs issued by a multi-slice processor.

* * * * *